US010712195B2

(12) United States Patent
Skrædderdal et al.

(10) Patent No.: US 10,712,195 B2
(45) Date of Patent: Jul. 14, 2020

(54) FOOD PROCESSING SYSTEM FOR PROCESSING AND BATCHING FOOD ITEMS

(71) Applicant: MAREL A/S, Aarhus N (DK)

(72) Inventors: Henning Skrædderdal, Viby J (DK); Henrik Kristiansen, Rønde (DK)

(73) Assignee: MAREL A/S, Aarhus N (DK)

( * ) Notice: Subject to any disclaimer, the term of this patent is extended or adjusted under 35 U.S.C. 154(b) by 46 days.

(21) Appl. No.: 15/543,690

(22) PCT Filed: Jan. 18, 2016

(86) PCT No.: PCT/EP2016/050914
§ 371 (c)(1),
(2) Date: Jul. 14, 2017

(87) PCT Pub. No.: WO2016/113428
PCT Pub. Date: Jul. 21, 2016

(65) Prior Publication Data
US 2018/0003544 A1    Jan. 4, 2018

(30) Foreign Application Priority Data

Jan. 16, 2015   (EP) ..................................... 15151485

(51) Int. Cl.
*G01G 13/00* (2006.01)
*G01G 19/24* (2006.01)
(Continued)

(52) U.S. Cl.
CPC ............. *G01G 13/003* (2013.01); *B07C 5/16* (2013.01); *B07C 5/38* (2013.01); *B26D 5/007* (2013.01);
(Continued)

(58) Field of Classification Search
CPC ........... B07C 5/16; B07C 5/34; B07C 5/3422; B07C 5/362; B07C 5/38; A22C 17/008;
(Continued)

(56) References Cited

U.S. PATENT DOCUMENTS 4,214,663 A * 7/1980 Schopp ................... B07C 5/361
198/349
7,258,237 B2 * 8/2007 Nielsen ...................... B07C 5/16
177/145
(Continued)

FOREIGN PATENT DOCUMENTS

WO    2014169925 A1    10/2014

OTHER PUBLICATIONS

European Search Report for corresponding European Application No. EP15151485, dated Apr. 20, 2015.
(Continued)

*Primary Examiner* — Charles A Fox
*Assistant Examiner* — Kalyanavenkateshware Kumar
(74) *Attorney, Agent, or Firm* — Workman Nydegger

(57) ABSTRACT

A food processing system and a method for processing and batching food items conveyed by a conveyor means where the batches fulfil at least one target criteria including at least one weight target, including a first weight determining means for determining the weight of incoming food items, a batching system, a food item separation device positioned downstream in relation to the first weight determining means and upstream in relation to the batching system, and a control system for controlling the batching system and the food item separation device. The controlling including, repeatedly: monitoring the weight of the incoming food items, determining, based on the weight of the incoming food items, a prospect indicator indicating the prospect to meet the target criteria for the batches such that each batch fulfils the at least one target criteria, and comparing if the prospect indicator fulfils a pre-defined criteria.

28 Claims, 4 Drawing Sheets

(51) Int. Cl.
  *B07C 5/38* (2006.01)
  *B07C 5/16* (2006.01)
  *B26D 5/00* (2006.01)
  *B26D 7/06* (2006.01)
  *B26D 7/30* (2006.01)
  *G01B 15/04* (2006.01)
  *G01G 9/00* (2006.01)
  *G01N 23/00* (2006.01)

(52) U.S. Cl.
  CPC .............. *B26D 7/0625* (2013.01); *B26D 7/30* (2013.01); *G01B 15/04* (2013.01); *G01G 9/005* (2013.01); *G01G 19/24* (2013.01); *G01N 23/00* (2013.01); *B26D 2210/02* (2013.01); *G01N 2223/618* (2013.01); *G01N 2223/633* (2013.01); *G01N 2223/643* (2013.01)

(58) Field of Classification Search
  CPC ......... A22C 17/0093; G01N 2223/618; G01N 2223/633; G01N 2223/643; G01G 9/005; G01G 13/003; G01G 19/24; B26D 7/0625; B26D 7/30; B26D 5/007
  See application file for complete search history.

(56) References Cited

U.S. PATENT DOCUMENTS

| | | | |
|---|---|---|---|
| 7,967,149 B2 * | 6/2011 | Helgi | B07C 5/16 |
| | | | 209/552 |
| 9,862,005 B2 * | 1/2018 | Struijk | B07C 5/38 |
| 2004/0176874 A1 * | 9/2004 | Kvisgaard | B07C 5/18 |
| | | | 700/240 |
| 2007/0178819 A1 * | 8/2007 | McKenna | A22B 5/007 |
| | | | 452/157 |
| 2010/0051513 A1 | 3/2010 | Skyum et al. | |

OTHER PUBLICATIONS

International Search Report for corresponding International PCT Application No. PCT/EP2016/050914, dated Apr. 15, 2016.

* cited by examiner

FOOD PROCESSING SYSTEM FOR PROCESSING AND BATCHING FOOD ITEMS

FIELD OF THE INVENTION

The present invention relates to a food processing system that is provided for processing and batching food items conveyed by a conveyor means where the batches fulfil at least one target criteria including at least one weight target.

BACKGROUND OF THE INVENTION

Often, when creating batches having pre-defined weight target of fixed number of food items it results in overweight. In general because a fixed number of items in a pack is often requested the pack weight can only be equal to the average weight of the items to be packed multiplied by the number of items in the pack. It will help somehow, if more than one pack weight is packed in parallel but the result will almost always be some overweight. It must also be considered, that when packing more than one pack size in parallel, and it is based on the weight distribution of the incoming items, then the distribution of different pack weights will probably not meet the desired distribution.

From the patent application US 2010/051513 A1 it is therefore known to weigh each food item entering a batching system and if the weight of the specific food item is above a predefined level, the food item can e.g. be trimmed or cut so that its weight is reduced below said level, to ensure that the weight of the food item will fit better in the current batching program. However further reduction of the risk of pack overweight is desired.

SUMMARY OF THE INVENTION

On the above background it is an object of embodiments of the present invention to provide an improved food processing system that maximizes the yield when generating batches fulfilling at least one target, including weight target, where the target may also include fixed number target for the food items in the batches.

In general, the invention preferably seeks to mitigate, alleviate or eliminate one or more of the above mentioned disadvantages of the prior art singly or in any combination. In particular, it may be seen as an object of embodiments of the present invention to provide an improved food processing system that solves the above mentioned problems, or other problems.

To better address one or more of these concerns, in a first aspect of the invention a food processing system is provided for processing and batching food items conveyed by a conveyor means where the batches fulfil at least one target criteria including at least one weight target, comprising:
 a first weight determining means for determining the weight of incoming food items,
 a batching system,
 a food item separation device positioned downstream in relation to the first weight determining means and upstream in relation to the batching system,
 a control system for controlling the batching system and the food item separation device, the controlling including, repeatedly:
  monitoring the weight of the incoming food items,
  determining, based on the weight of the incoming food items, a prospect indicator indicating the prospect to meet the target criteria for the batches such that each batch fulfils the at least one target criteria,
  comparing if the prospect indicator fulfils a pre-defined criteria,
  in case the prospect indicator does not fulfils the pre-defined criteria, instructing the food item separation device to separate at least some of the incoming food items such that the weight of the food items coming to the batching system, after passing the food item separation device, have a prospect indicator fulfilling the pre-defined criteria so that the weight of the food items coming to the batching system becomes useful for completing batching the food items according to the target criteria.

Accordingly, the yield of the batching process may be greatly increased due to the little overweight that will result from the batching process.

As an example, a situation that may easily occur is that the food items, e.g. chicken fillets, come in lots from different farmers, where the size of the incoming fillets is on average suddenly different. Thus, the food processing system is capable of reacting on this by adapting the weight of the incoming food items so that they become useful to complete the batches with minimum overweight.

Thus, by motoring the weight of several food items in or imidiately before the batching system according to the present method, it is possible to determine a prospect indicator so that the decision of whether or not to trim or cut a specific food item can be taken on the basis of a more general and dynamic evaluation—i.e. on the basis of the probability of this trimming or cutting process actually will reduce the risk of pack overweight. In the prior art system a food item weighing 30% too much—in relation to the ideal weight of the specific batching program (i.e. the predefined ideal weight)—would always be cut, even if a food item being 35% underweight was already present in the batching system—i.e. even if a more ideal batching match could be made by not cutting or trimming the overweight food item. Thus, by introducing the prospect indicator the food items that are cut or trimmed are selected on the basis of reducing the probability of pack overweight (or increasing the chance of optimal weight in the batched packs) while in the prior art systems the food items that are cut or trimmed are selected on the basis or their weight in relation to a predefined ideal weight.

In one embodiment, the determined weight of the incoming food items define a first weight distribution, and wherein the pre-defined criteria comprises a pre-defined weight interval within the first weight distribution useful for completing batching the food items with minimum overweight, where in case the pre-defined criteria is not fulfilled the weight of the incoming food items is above the pre-defined weight interval. Thus, by indicating in that way that the incoming food items on average are too heavy it is possible to adjust the first distribution such that it fits to the distribution, or target distribution which may be pre-defined in light of the at least one target criteria, so that the at least one target criteria may be fulfilled with minimum overweight. The "width" of the weight interval may as an example be 10% of an average weight needed to complete a batch of e.g. average weight of 150 g. As an example, if the target criteria is 400 g batch and a further target may be that the number of food items is 4, the average weight is 100 g. Thus, the "width" of the weight interval may be 90-110 g. This should of course not be limited to the these numbers.

In one embodiment, statistical probability calculations may be implemented to generate the batches, i.e. selecting food items for the batches meaning which items should go to which batch.

In one embodiment, the first weight determining means further comprises a shape determining means for determining the shape and position of the incoming food items, where the item separation device comprises a cutting device including a cutting means adapted to cut at least some of the incoming food items based on the determined shape and position of the incoming items. The first weight determination may be based on a shape and position determination means, e.g. it may comprise a traditional vision technology where based on volumetric measurement the weight may be determined, or it may comprise x-ray apparatus preferably of dual energy type so that the weight of the incoming food items may be determined and preferably also the exact position of the incoming food items. The weight may be based on the shape i.e. volume metric measurement and the like. The cutting means may comprise rotating blade that may arranged at the side of the conveyor means or above the conveyor means, or the cutting means may comprise a high pressurized water cutter. In an embodiment, the operation of the cutting means is based on cutting the incoming food items in as natural shape as possible, e.g. if the food items is salmon fillet, so that the salmon fillet(s) after undergoing the cutting process look as if they have not been cut. This may further increase the yield of the batching process.

In one embodiment, the batching system comprises at least one controllable handling means of a robot type for selective transfer of food items from the conveyor means to the batches. As an example, two or more robotic systems including robotic arms may be arranged along the conveyor means adapted for picking up and place the food items in e.g. trays in a highly efficient manner, where the controlling is based on information from the shape and position determining means.

The batching system should however not be construed as being limited to a robotic system but it may just as well comprise a conveyor including swing arms to move items from the conveyor into bins along at least one side of the conveyor, or it may comprise a multihead combination weigher.

In one embodiment, food processing system further comprises a second weight determining means positioned downstream in relation to the food item separation device and upstream in relation to the batching system for determining the weight of the food items coming to the batching system, after passing the food item separation device, the determined weight defining a second weight distribution. Thus, an exact weight of the food items after undergoing a food item separation process at the food item separation device may be registered. Scenarios may also easily occur where the cut out parts of the food items that are supposed to be removed stick to the food items. Therefore, this may be determined and corrected accordingly, e.g. by rejecting the items or by means of manually removing the cut out parts. The second weight determining means may e.g. be any type of a scale such as dynamic scale, or be a vision system that based on volumetric measurements determines the weight of the food items.

In one embodiment, the control system comprises:

a first control device operably connected to the first weight determining means, and a second control device operably connected to the second weight determining means, the second control device being adapted for determining a further prospect indicator and to determine if it is within the pre-defined weight interval within the second weight distribution, wherein the first and the second control devices communicate with each other including sending a feedback data by the second control device to the first control device indicating whether the first weight distribution is considered to be useful for completing batching the food items with minimum overweight.

In one embodiment, the food processing system further comprises a reject device positioned downstream in relation to the item separation device for automatically rejecting cut parts of the food items after undergoing a food item separation process at the food item separation device. In that way, a fully automatized system is provided for fully completing the batches and where the manual labour is minimized.

In one embodiment, the food processing system further comprises a vision system positioned upstream in relation to the batching system and downstream in relation to the food item separation device for determining the position of the food items after undergoing a food item separation process at the food item separation device. In that way, the batching system knows accurately at all times the exact position of the food items which allow e.g. picking and placing the food items into e.g. trays.

In one embodiment, the at least one target criteria further includes at least one of the following:

number target indicating the number of the food items in the batches, appearance target indicating the appearances of the food items in the batches, two or more weight targets.

If the number of target is e.g. 4 or 5 items in a tray, and where the batching includes two different weight targets, one with four items and one with five items, there will e.g. be two different distributions and where there will be two different prospect indicators, each of which being associated to the respective batch. This number targets and weight targets could of course include more than two targets, e.g. there could be a single number target, e.g. four items, and two or more weight targets.

In an embodiment, the batching may include bringing food items together that are not fed to the batching system sequential.

In one embodiment, the prospect indicator is determined on the basis of the weight of a plurality of incoming food items. Establishing the prospect indicator in the basis of a plurality of food items in the food processing system is advantageous in that it increases the precision of the prospect indicator and thus reduces the risk of pack overweight.

In one embodiment, the prospect indicator is determined on the basis of the weight of the last four incoming food items, the last eight incoming food items and most preferred the last twelve incoming food items. The fewer food items used for determining the prospect indicator, the more inaccurate the prospect indicator will be. However, the more food items used for determining the prospect indicator, the more complex and time consuming calculations has to be made increasing the risk of faults in or based on the prospect indicator. Thus, the present number ranges present advantageous ranges regarding prospect indicator precision.

In one embodiment, the prospect indicator is determined on the basis of the weight of the incoming food items after the incoming food items have passed the food item separation device. Determining the prospect indicator only on food items that have passed the food item separation device is advantageous in that prospect indicator hereby is more precise due to the fact that it is calculated on the basis of the weight of the food items as it is in the batching system.

In one embodiment, the prospect indicator is determined on the basis of the weight of the incoming food items already in the batches. In some cases food items will pass all the way through the batching system without being batched even though they would fit the current batching program. This could e.g. be due to a temporarily overload of a specific placing mean (such as a specific robot) in the batching system. Thus, by determining the prospect indicator on the basis of the weight of the food items that have already been batched the accuracy of the prospect indicator is further increased.

In one embodiment, the prospect indicator is determined on the basis of the weight of at least some of the food items that are ready to be moved to batch/trays, the weight of at least some of the incoming food items already in the batches, and the weight of the food item under consideration for being reduced in size. By determining the prospect indicator of these items in different locations in the system or different stages of the process a more accurate prospect indicator is achieved.

In one embodiment, the pre-defined criteria is based on the target criteria including at least one weight target which will ensure that when the prospect indicator fulfils the pre-defined criteria the risk of batch overweight is reduced.

In one embodiment, the pre-defined criteria is higher than the target criteria including at least one weight target. By making the pre-defined criteria weight higher than the target criteria weight the risk of batch underweight is eliminated or at least drastically reduced.

In one embodiment, the pre-defined criteria is a weight interval. Forming the pre-defined criteria is a weight range is advantageous in that this provides flexibility and latitude to the system.

In one embodiment, the prospect indicator further includes indicating the weight of food items needed to complete the batches. By indicating the weight of the food items it is possible to more precisely trim or cut them to better fit the current batching program.

In one embodiment, the weight of food items needed to complete the batches is utilized to instruct the food item separation device to cut at least one of the incoming food items accordingly. This is advantageous in that it increases the chance of completing the batches with minimum overweight.

In one embodiment, the control system comprises means for determining the prospect indicator on the basis of statistical probability calculations. By constantly performing statistical probability calculations based on a number of food items in the food processing system it is possible to continually optimise the decision process regarding whether or not to cut or trim a specific food item before it reaches the batching system—thereby reducing the risk of pack overweight.

In one embodiment, the statistical probability calculations includes determining the prodability of the food items coming to the batching system becoming useful for completing batching the food items according to the target criteria. Continuously determining if a specific food item will increase the chance of meeting the target criteria is advantageous in that better decisions regarding whether or not to cut or trim a specific food item can be taken.

In one embodiment, the batching may include bringing food items together that are not fed to the batching system sequential. By not batching the food items sequential it is possible to enlarge the pool from which a specific batch can be made significantly. This is advantageous in that hereby significantly increases the chance of meeting the target criteria without substantial overweight.

In one embodiment, a cut-off-target may be defined defining a minimum amount allowed to be removed from the food items. This is to prevent that a too little part is removed from the food items, as too little amount of cut would otherwise be considered to be a waste.

In one embodiment, a cut-off-target may be defined defining a maximum amount allowed to be removed from the food items. This is to prevent that the food items will have a strange appearance which could easily be the case if too much is removed from the food items.

In one embodiment, the batching system further includes a checking facility such that cut food items that are sticking together and where removing the cut part has failed may be detected and may be disregarded in the batching process. Disregarding food items that have not been properly cut is advantageous in that it prevents these food item from being batched. The decision regarding which food items to disregard may may be done automatically with e.g. imaging or be done manually.

In a second aspect of the invention a method performed in a food processing system is provided for processing and batching food items conveyed by a conveyor means where the batches fulfil at least one target criteria including at least one weight target, where the food processing system comprises:

a first weight determining means for determining the weight of incoming food items, a batching system, a food item separation device positioned downstream in relation to the first weight determining means and upstream in relation to the batching system, a control system for controlling the batching system and the food item separation device, the controlling including, repeatedly:

monitoring the weight of the incoming food items, determining, based on the weight of the incoming food items, a prospect indicator indicating the prospect to meet the target criteria for the batches such that each batch fulfils the at least one target criteria, comparing if the prospect indicator fulfils a pre-defined criteria, in case the prospect indicator does not fulfils the pre-defined criteria, instructing the food item separation device to separate at least some of the incoming food items such that the weight of the food items coming to the batching system, after passing the food item separation device, have a prospect indicator fulfilling the pre-defined criteria so that the weight of the food items coming to the batching system becomes useful for completing batching the food items according to the target criteria.

In one embodiment, the determined weight of the incoming food items define a first weight distribution, and wherein the pre-defined criteria comprises a pre-defined weight interval within the first weight distribution useful for completing batching the food items with minimum overweight, where in case the pre-defined criteria is not fulfilled the weight of the incoming food items is above the pre-defined weight interval.

In one embodiment, the method further comprises determining the shape and position of the incoming food items, where the resulting shape and position data are used as control data for cutting at least some of the incoming food items based on the determined shape and position of the incoming food items.

In one embodiment, the method further comprises defining a threshold value indicating the minimum or maximum allowable amount to be separated from the at least some of the incoming food items.

In one embodiment, the method is performed in a food processing system according to any of the previously mentioned food processing systems.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
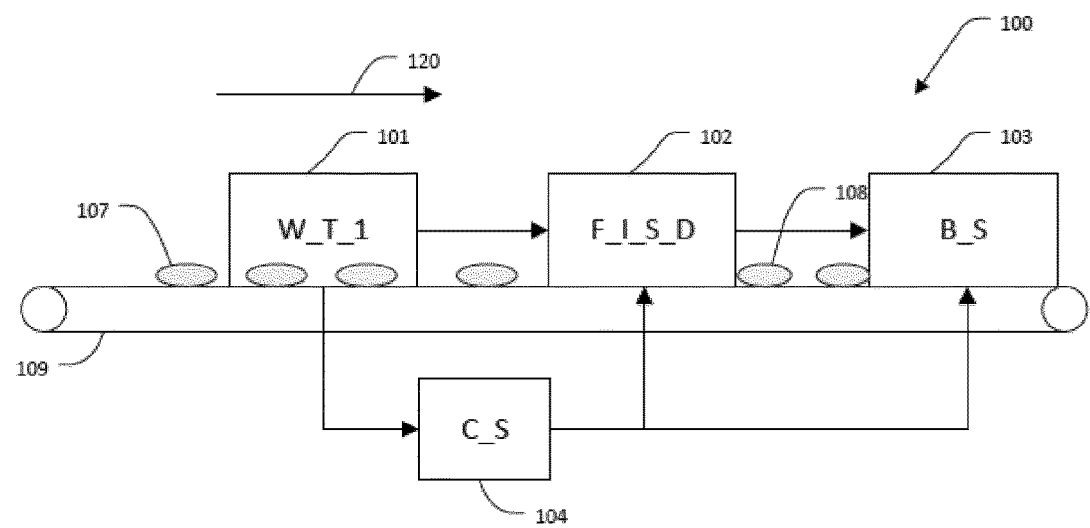
FIGS. 1 and 2 show two different embodiments of a food processing system according to the present invention for processing and batching food items conveyed by a conveyor means.

FIG. 1 shows an embodiment of a food processing system 100 for processing and batching food items conveyed by a conveyor means 109 in a conveying direction as indicated by arrow 120, where the batches fulfil at least one target criteria including at least one weight target. The food processing system 100 comprises a first weight determining means (W_T_1) 101 for determining the weight 105 of incoming food items, a batching system (B_S) 103, a food item separation device (F_I_S_D) 102 positioned downstream in relation to the first weight determining means 101 and upstream in relation to the batching system 103 and a control system (C_S) 104 for controlling the batching system 103 based on the weight data and the food item separation device 102, also based on the weight data. The controlling includes, repeatedly monitoring the weight of the incoming food items 107, determining, based on the weight of the incoming food items 107, a prospect indicator indicating the prospect to meet the target criteria for the batches such that each batch fulfils the at least one target criteria, and comparing if the prospect indicator fulfils a pre-defined criteria. In case the prospect indicator does not fulfils the pre-defined criteria, the controlling further includes instructing the food item separation device to separate at least some of the incoming food items such that the weight of the food items coming to the batching system, after passing the food item separation device, have a prospect indicator fulfilling the pre-defined criteria so that the weight of the food items coming to the batching system becomes useful for completing batching the food items according to the target criteria.

The determined weight of the incoming food items may be utilized to define a first weight distribution, and wherein the pre-defined criteria comprises a pre-defined weight interval within the first weight distribution useful for completing batching the food items with minimum overweight, where in case the pre-defined criteria is not fulfilled the weight of the incoming food items is above the pre-defined weight interval.

In one embodiment, the first weight determining means further comprises a shape determining means for determining the shape and position of the incoming food items, where the item separation device comprises a cutting device including a cutting means adapted to cut at least some of the incoming food items based on the determined shape and position of the incoming items. The weight and shape measuring means may as an example comprises an X-ray apparatus that allows both utilizing the X-ray data to determine the weight of the food items and the size and/or the shape and the position of the food items, or a weighing device and a vision system. This information is then utilized by the control data to control the food item separation device 102, which may be any type of apparatus comprising a cutting means that cuts the food items to fit to the first weight distribution.

The batching system 103 may comprise at least one controllable handling means of a robot type, e.g. plurality of robotic arms, for selective transfer of food items from the conveyor means to the batches.

Figure 2:
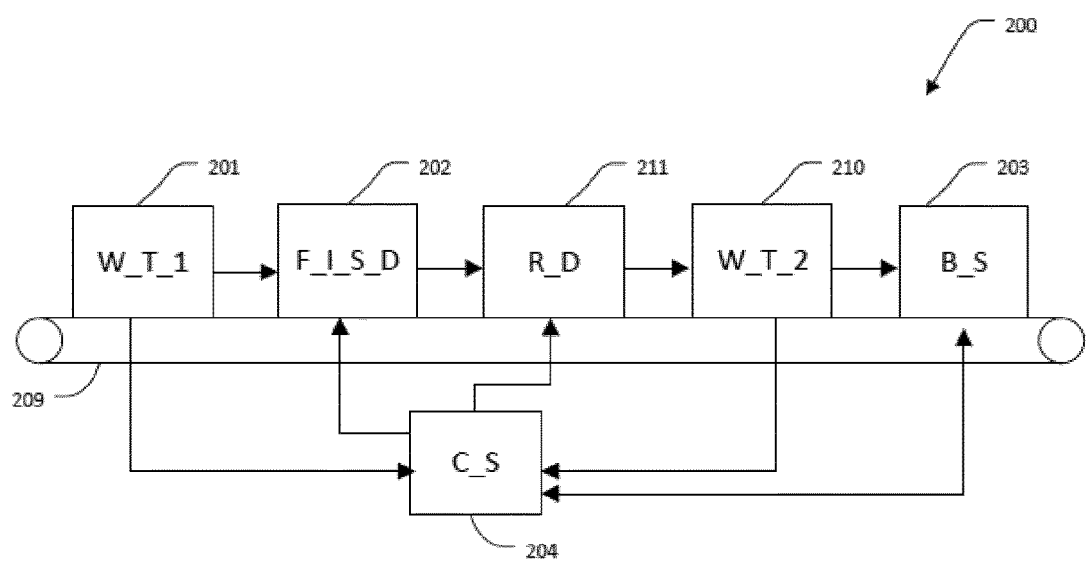

FIG. 2 shows another embodiment of a food processing system 200 according to the present invention, also comprising a first weight determining means (W_T_1) 201 for determining the weight of incoming food items, a batching system (B_S) 203, a food item separation device (F_I_S_D) 202 positioned downstream in relation to the first weight determining means 201 and upstream in relation to the batching system 203 and a control system (C_S) 204 for controlling the batching system 103 based on the weight data and for controlling the food item separation device 202, also based on the weight data.

In this embodiment, the food processing system 200 further comprises a second weight determining means (W_T_2) 210, which may be a volumetric measurement based on a vision system, positioned downstream in relation to the item separation device 202 and upstream in relation to the batching system 203 for determining the weight of the food items coming to the batching system, after passing the food item separation device 202. In this embodiment the determined weight may be utilized to define a second weight distribution. This second distribution may be processed and utilized to determine the prospect indicator, i.e. to determine if the distribution is suitable to achieve the minimum overweight, or not. This would typically be the case if the food items are too heavy on average and where the weight distribution must be adapted to the batches that are being made.

The food processing system 200 further comprises reject device (R_D) 211 positioned downstream in relation to the item separation device 202 for automatically rejecting cut parts of the food items after undergoing a food item separation process at the food item separation device, and a vision system positioned upstream in relation to the batching system and downstream in relation to the food item separation device for determining the position of the food items after undergoing a food item separation process at the food item separation device. The vision system may as an example be an integral part of the second weight determining means 210, i.e. if the second weight determining means 210 is an X-ray system that utilizes both the X-ray data for determining the weight of the food items going to the batching system and also the position of the food items.

The control system 204 may be in one embodiment comprise a first control device operably connected to the first weight determining means 201, and a second control device operably connected to the second weight determining means 210, where the second control device determines a further prospect indicator and determines if it is within the pre-defined weight interval within the second weight distribution, wherein the first and the second control devices preferably communicate with each other by e.g. means of sending a feedback data by the second control device to the first control device indicating whether the first weight distribution is considered to be useful for completing batching the food items with minimum overweight.

Figure 3:
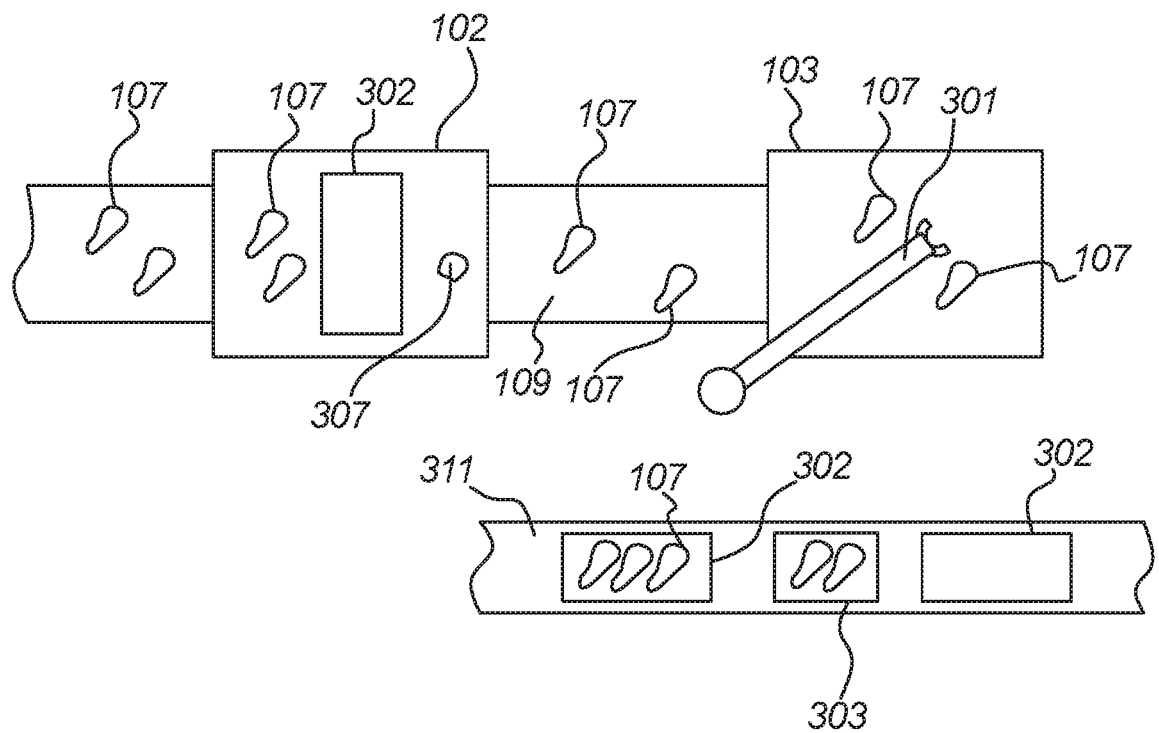
FIG. 3 illustrates a top view of a part of an embodiment of the food processing system, FIG. 4 schematically illustrates the food processing system.

FIG. 3 illustrates a top view of a part of an embodiment of the food processing system 100. Illustrated is the food item separation device 102, the batching system 103 and the conveyor means 109 which transports the incoming food items 107 to the food item separation device 102 and the batching system 103.

The food item separation device 102 may comprise a cutting device 320 arranged to cut the incoming food items 107 into cutted food items 307 according to instructions received from the control system 104. The cutting device may be embodied by a cutting means, e.g. a knife, connected to a robot arm, or other controllable device, capable of moving the cutting means to particular food items 107 intended to be cut.

The batching system 103 may comprise at least one controllable handling means 301, e.g. embodied by one or more robot arms, capable of transferring particular food items 107 from the conveyor 109 to batches 302, 303. The batches 302, 303 may be of the same type or of different types, e.g. different types for accommodating different numbers of food items 107 and or different total weights of food items in the batches. It is understood that different types of batches 302, 303 may in fact by structurally identical, but intended for accommodating different numbers of food items 107. For example, batches 302 may be used for 400 g batch jobs, where each batch should contain two items 107 with a total weight of at least 400 g. Batches 303 may similarly be used for 400 g batch jobs, where each batch should contain three items 107 with a total weight of at least 400 g. The batches 302, 303 may be transported on a batch conveyor 311.

The examples described in relation to FIG. 3 apply equally to the item separation device 202, batching system 203 and control system 204 of system 200.

According to an embodiment, the prospect indicator is an indicator indicating the prospect to meet one or more target criteria for the batches such that each batch fulfils the at least one target criterion, e.g. the prospect to meet the target criteria in the form of a weight, or average weight of a number of batches, such that each batch satisfies a weight criterion. For example, the prospect indicator may be in the form of a probability indicator indicating the probability that a target criterion for the batches is fulfilled so that each batch satisfies a weight criterion. In another example, the prospect indicator may be an estimated average weight of a number of future batches to be produced, where the average weight relates to the target criteria for the batches. Similarly, the prospect indicator may be an over-weight, or average over-weight, of a number of future batches to be produced, where the over-weight relates to the target criteria for the batches.

The prospect indicator may in general be determined based on the weight of the incoming food items, e.g. based on the weight of a pre-determined plurality of incoming food items, e.g. based on the last twelve incoming food items. The weights of the incoming food items 107 may be the weights of a number of food items being outputted from the food item separation device 102, 202. The weights of the incoming food items 107 outputted from the separation device 102, 202 may be determined based on information relating to the amounts having been cut away from particular food items 107 or by other weighing methods such as weighing methods applied by the weight determining means. Alternatively, the weights of the incoming food items 107 may be the weights of a number of food items being placed in the batches 302, 303 or planned to be placed in the batches. In another alternative, the weights of the incoming food items 107 may be the weights of a number of food items 107 being outputted from the first weight determining means 101 or inputted to the separation device 102, 202.

For example, based on information of weights of the incoming food items 107 in the form of weights of a number, possibly predetermined number, of food items being outputted from the food item separation device 102, 202, but possibly not yet placed into batches 302, 303, it is possible to determine how the number of food items can be placed into batches so that the batches fulfil the target criteria and what the resulting over-weights of each batch will be. Here it is assumed that each batch has to satisfy a minimum weight, e.g. 400 g for 400 g batch jobs. This has the result that each batch will have an over-weight. It may desirable to minimize these over-weights. If, in addition to the weights of the predetermined number (e.g. 12) of the incoming food items 107, the weight of one or more (e.g. 1) food items 107 to be processed in the food item separation device 102, 202 is included in determination of how all these (e.g. 12+1) food items can be placed into batches so that the batches fulfil the target criteria, then the new resulting over-weights of each batch of these food items (12+1) can be used as a prospect indicator. That is, if the new resulting over-weights show an undesired increase in over-weights, these resulting over-weights can be used as a prospect indicator for determining instructions for instructing to the food item separation device 102, 202 to separate at least some of the one or more incoming food items 107 to be processed in the food item separation device 102, 202, i.e. instruction that will reduce, at least in average, these over-weights.

For example, the prospect indicator in the form of the new resulting over-weights may be compared with pre-defined criteria, e.g. pre-defined allowable over-weights. In case the prospect indicator does not fulfil the pre-defined criteria, i.e. if the new resulting over-weights are greater than the allowable over-weights, instructions may be determined for instructing the food item separation device to separate at least some of the incoming food items such that the food items coming to the batching system can be placed into batches so that the batches fulfil the target criteria, e.g. so that the over-weights of the batches are reduced or fulfil target over-weights.

In an embodiment the food processing system 100 could operate as follows:

In a first step the food item 107 reaches first weight determining means 101, 201 which in an embodiment comprises a vision station to determine the volume of the food item 107. The volume is determined by means of a laser line illuminating the food item 107 e.g. from vertically above in a direction perpendicular to the conveyor direction and a camera to observe said laser line from an angle in the conveying direction or in the opposite direction of the conveying direction. When said laser line is observed in the described way it will appear as a non-straight line when an item is conveyed under it, where the diversion from straight is proportional to the height of the item. At the sides of the item the height is found to be zero, so in this way the width of the food item 107 is found. The length of the food item 107 is found by measuring the speed of the conveyor means 109 and use it in combination with the laser line detection. The volume can then be calculated based on these height, width and length observations. The volume can then be converted to weight by using a density factor, i.e. a weight to volume ratio. It is decided immediately after the volume and weight determination, for each food item 107, if the food item 107 has to be reduced in size (i.e. in weight). The method used to this decision will be described later.

Downstream to the volume determination, a food item separation device 102, 202 is arranged. In this embodiment the food item separation device 102, 202 comprises a sword-type knife that is suspended in a rotatable manner with its suspension point at the side of a gap in the conveyor means 109. In another embodiment the gap can be a gap between two conveyors means 109 that are installed end to end or the gap can be arranged in another way. When a food item 107 is to be cut, the knife is rotated through the gap when the food item 107, is in the correct position in relation to the gap. The cut can be performed vertically from above or it can be performed with an angle in which case the food item 107 will appear more natural than if it is cut vertically from above. Downstream to the food item separation device 102, 202, optionally, a rejection station (not shown) can be arranged to remove the cut off part from the conveyor. One way of performing the rejection is to open the conveyor means 109 such that the cut off part can fall through the opening. However, such an opening can be formed in several other ways e.g. as described in WO 2014 169925.

Downstream to the optional reject station, second weight determining means 210 can be situated as shown in FIG. 2. The second weight determining means 210 is arranged to determine the exact weight of the cut food item 107. The second weight determining means 210 will thereby also check if the cut off part in fact has been rejected at the rejection station (sometimes a cut off part sticks firmly together with the main piece and so it remains there). The second weight determining means 210 can furthermore be used to determine (or update) the density factor used to convert volume to weight (as explained above), because the weight of the non-size-reduced food items 107 (or maybe of all the food items 107 in the system 100, 200) can be compared with the volume of the same food item 107, one by one. If the second weight determining means 210 is not present, the density factor has to be entered and maintained manually.

Downstream to the second weight determining means 210, a second vision station (not shown) can be situated. Here the exact position of the food item 107 can be determined such that the controllable handling means 301—e.g. in the form of a robot gripper—can pick it up and move it accurately to a position in a batch/tray 302, 303.

In an embodiment the decision regarding which batch/tray 302, 303 the controllable handling means 301 should place the food item 107 in is based on the weight of at least the oldest one of the weight determined food items 107 that have not passed a certain decision point on the conveyor means 109 and the food items 107 that are already moved to unfinished batch/trays 302, 303.

In this embodiment the prospect indicator is at least partly based on the weight of some of the food items 107 that are ready to be moved to batch/trays 302, 303, the weight of some of the food items 107 that have already been moved to batch/trays 302, 303 and the weight of the food item 107 under consideration for being reduced in size. I.e. in this embodiment the decision regarding if the food item 107 under consideration advantageously can be reduced in size it taken on the basis of the weight several food items already present in the system 100, 200 so that the prospect indicator changes constantly and dynamically in response to the current supply and demand and.

In more details an embodiment could be: The number of food items 107 ready to be batched is e.g. 4 items, and the number of food items 107 already batched—but in unfinished batches 302, 303—e.g. 20 items. Including the food item 107 under consideration the prospect indicator will in this case be determined on the basis of a total of 25 items 107. In this embodiment the target criteria for a batch/tray is 400 g consisting of two or three food items 107. To avoid underweight target criteria regarding weight will in this case be transformed to a pre-defined criterion in the interval from 401 g to 404 g—making the decision target 404 g.

To decide whether or not to cut the food item 107 under consideration in this embodiment, the 25 food items 107 are put in sequence by weight (or estimated weight). It can then be decided how many of these food items 107 that qualify for being used in batch/trays 302, 303 with only two items. I.e. if e.g. the ten heaviest food items 107 together on average weigh more than 202 g (decision target 404 g divided by 2 items) then these the food items 107 qualify for that. If e.g. the total weight for these ten food items 107 is 2030 g and the food item 107 under consideration is among these ten items 107, then it will be decided that this food item 107 shall be reduced in size with 10 g such that the average of the largest ten food items 107 is 202 g. However, if the food item 107 under consideration is not among the ten largest items, then the sum of the remaining fifteen food items 107 is found—which could be e.g. 2090 g. Fifteen food items 107 distributed with three in each batch/tray 302, 303 will form five batch/trays 302, 303. Five batches/trays 302, 303 with 404 g in each make a total of 2020 g. Hence the food item 107 under consideration will in this embodiment have to be reduced in size with 70 g (2090 g minus 2020 g) such that the sum of the fifteen smallest food items 107 is reduced to a total weight of 2020 g.

Thus, according to this example, the food-item weights are sorted in a list with highest weights first. An algorithm then removes food items 107 from start of the list until the removed food items have an optimal average weight for the lowest item count (e.g. 2-item batches) or the list is empty. If the list is empty, excess weight is the difference between the actual average and an optimal average multiplied with number of food items. If the list is not empty a similar process is performed on the next lowest item count (e.g. 3-item batches) and so on, until the list is empty or higher item count is not allowed. If the list becomes empty this means overweight.

The one or more new food items, i.e. the one or more incoming food items 107 about to be processed (or not processed) in the food item separation device 102, 202 is taken into consideration by means of adding weights of these one or more new food items to the list, preferably before the list is sorted. Analysis of this updated list of weights of incoming food items 107 may enable determination of the prospect indicator and determination of instructions for the food item separation device 102, 202. According to embodiment, when food items are removed from the list, i.e. removed for placing in a batch, this can be done in fractions of a food item to obtain optimal average before going on with the next higher item count. The fraction of the food item can be obtained for unprocessed food items by determining instructions for the food item separation device 102, 202 to cut an unprocessed food item to obtain the desired fraction of a food item.

I.e. in an embodiment a reasonable number to be used as the number of food items 107 already batched (above it is 20 items) can be found as a fraction (F) of the total number of food items 107 that can be in the batch/trays 302, 303 currently being filled. If e.g. sixteen batch/trays 302, 303 are under filling simultaneously with two or three food items 107, sixteen times 2.5=40 food items 107 can be said to be in the batch/trays 302, 303 that are under filling. The fraction (F) can be chosen to be ½. Hence a reasonable number to be used as the number of food items 107 already batched would then be twenty. The factor F can be adjusted up and down depending on the raw material, if e.g. the input changes often in size, then a smaller part than ½ can be used, and opposite, if the input is very constant in size, then a higher value can be used.

There can be set limits for how much and how little that it is allowed to cut off in the food item separation device 102, 202. A minimum limit can be set to avoid that a cut off part cannot be controlled simply because it is too small, and a maximum limit can be set to avoid that the main piece is too odd shaped compared to its natural shape. These limits can be set in gram or millimeters (number or percentage).

In this embodiment a tracking system is incorporated in the system 1 such that every food item 107 is followed and tracked through the process.

Figure 4:
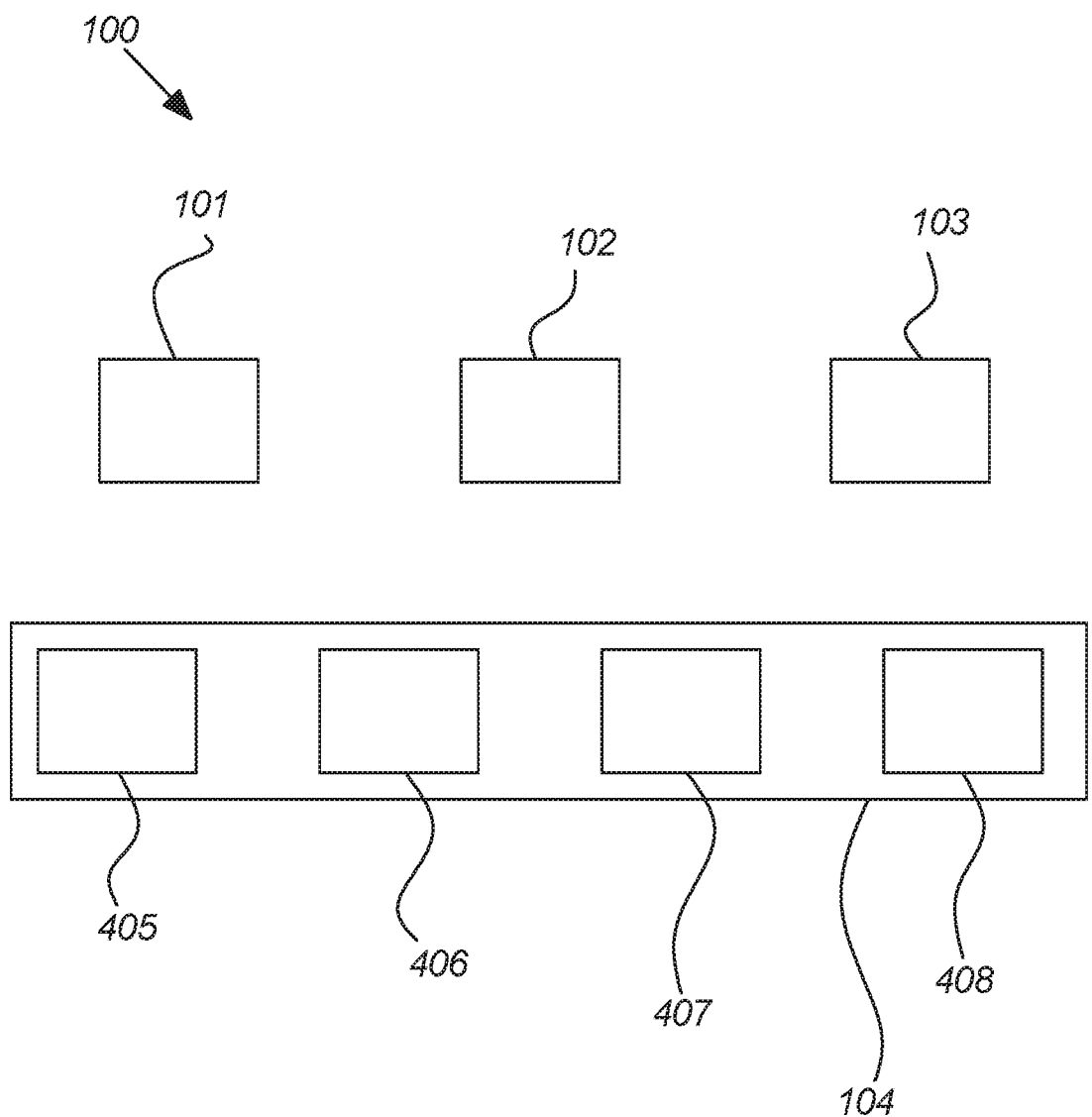

FIG. 4 schematically illustrates the food processing system 100 which comprises a first weight determining means 101, a food item separation device 102, a batching system 103 and a control system 104. The control system 104 may comprise a monitoring device 405 for monitoring the weight of the incoming food items 107, a prospect determining means 406 for determining a prospect indicator, a comparing means 407 for comparing the prospect indicator with a pre-defined criteria, and an instruction determining means 408 for determining instructions for instructing the food item separation device to separate at least some of the incoming food items so that the prospect indicator is changed so that the batches better fulfils the pre-defined criteria. The control system 104 and its components 405-408 may equally describe the control system 204.

Figure 5:
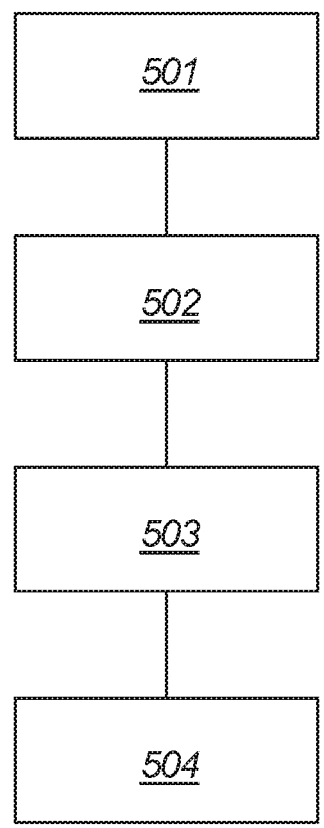
FIG. 5 illustrates a method for processing and batching food items.

FIG. 5 illustrates a method for processing and batching food items conveyed by a conveyor means comprising:

Step 1: monitoring the weight of the incoming food items,
Step 2: determining based on the weight of the incoming food items, a prospect indicator indicating the prospect to meet the target criteria for the batches such that each batch fulfils the at least one target criteria,
Step 3: comparing if the prospect indicator fulfils a pre-defined criteria, and
Step 4: in case the prospect indicator does not fulfil the pre-defined criteria, instructing the food item separation device to separate at least some of the incoming food items such that the weight of the food items coming to the batching system, after passing the food item separation device, have a prospect indicator fulfilling the pre-defined criteria so that the weight of the food items coming to the batching system becomes useful for completing batching the food items according to the target criteria.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

LIST 100, 200. Food processing system
101, 201. First weight determining means (W_T_1)
102, 202. Food item separation device (F_I_S_D)
103, 203. Batch system (B_S)
104, 204. Control system (C_S)
105. Weight
107. Incoming food items
109. Conveyor means
120. Conveying directions
210. Second weight determining means (W_T_2)
211. Reject device (R_D)
301. Controllable handling means
302, 303. Batch
307. Cutted food item
311. Batch conveyor
320. Cutting device
405. Monitoring device
406. Determining means
407. Comparing means
408. Instruction determining means
501. Method step 1
502. Method step 2
503. Method step 3
504. Method step 4

The invention claimed is:

1. A food processing system for processing and batching food items conveyed by a conveyor means where the batches fulfil at least one target criteria including at least one weight target, comprising:
  a first weight determining means for determining the weight of incoming food items,
  a batching system,
  a food item separation device positioned downstream in relation to the first weight determining means and upstream in relation to the batching system, where the food item separation device comprises a cutting device including a cutting means adapted to cut at least some of the incoming food items,
  a control system for controlling the batching system and the food item separation device, the controlling including, repeatedly:
  monitoring the weight of the incoming food items,
  determining, based on the weight of the incoming food items, a prospect indicator indicating the prospect to meet the at least one target criteria for the batches such that each batch fulfils the at least one target criteria,
  comparing if the prospect indicator fulfils a pre-defined criteria,
  in case the prospect indicator does not fulfil the pre-defined criteria, instructing the food item separation device to separate at least some of the incoming food items such that the weight of the food items coming to the batching system, after passing the food item separation device, have a prospect indicator fulfilling the pre-defined criteria so that the weight of the food items coming to the batching system becomes useful for completing batching the food items according to the at least one target criteria;

wherein the control system comprises means for determining the prospect indicator on the basis of statistical probability calculations, including determining the probability of the food items coming to the batching system becoming useful for completing batching the food items according to the at least one target criteria;

wherein a reject device is positioned downstream in relation to the food item separation device for automatically rejecting cut parts of the food items after undergoing a food item separation process at the food item separation device.

2. The food processing system according to claim 1, wherein the determined weight of the incoming food items define a first weight distribution, and wherein the pre-defined criteria comprises a pre-defined weight interval within the first weight distribution useful for completing batching the food items with minimum overweight, where in case the pre-defined criteria is not fulfilled the weight of the incoming food items is above the pre-defined weight interval.

3. The system according to claim 1, wherein the first weight determining means further comprises a shape determining means for determining the shape and position of the incoming food items, where the food item separation device comprises a cutting device including a cutting means adapted to cut at least some of the incoming food items based on the determined shape and position of the incoming food items.

4. The food processing system according to claim 1, wherein the batching system comprises at least one controllable handling means of a robot type for selective transfer of food items from the conveyor means to the batches.

5. The food processing system according to claim 1, wherein the first weight determining means comprises an X-ray apparatus for determining the weight and is adapted for further determining position and/or shape of the incoming food items.

6. The food processing system according to claim 1, further comprising a second weight determining means positioned downstream in relation to the food item separation device and upstream in relation to the batching system for determining the weight of the food items coming to the batching system, after passing the food item separation device, the determined weight defining a second weight distribution.

7. The food processing system according to claim 6, wherein the control system comprises:

a first control device operably connected to the first weight determining means, and a second control device operably connected to the second weight determining means, the second control device being adapted for determining a further prospect indicator and to determine if it is within the pre-defined weight interval within the second weight distribution, wherein the first and the second control devices communicate with each other including sending a feedback data by the second control device to the first control device indicating whether the first weight distribution is considered to be useful for completing batching the food items with minimum overweight.

8. The food processing system according to claim 1, further comprising a vision system positioned upstream in relation to the batching system and downstream in relation to the food item separation device for determining a position of the food items after undergoing a food item separation process at the food item separation device.

9. The food processing system according to claim 1, wherein the at least one target criteria further includes at least one of the following:

number target indicating the number of the food items in the batches, appearance target indicating the appearances of the food items in the batches, two or more weight targets.

10. The food processing system according to claim 1, wherein the prospect indicator is determined on the basis of the weight of a plurality of incoming food items.

11. The food processing system according to claim 10, wherein the prospect indicator is determined on the basis of the weight of the incoming food items after the incoming food items have passed the food item separation device.

12. The food processing system according to claim 1, wherein the prospect indicator is determined on the basis of the weight of the last four incoming food items.

13. The food processing system according to claim 10, wherein the prospect indicator is determined on the basis of the weight of at least some of the incoming food items already in the batches.

14. The food processing system according to claim 1, wherein the prospect indicator is determined on the basis of the weight of at least some of the food items that are ready to be moved to batch/trays, the weight of at least some of the incoming food items already in the batches, and the weight of the food item under consideration for being reduced in size.

15. The food processing system according to claim 1, wherein the pre-defined criteria is based on the at least one target criteria including at least one weight target.

16. The food processing system according to claim 1, wherein the pre-defined criteria is higher than the at least one target criteria including at least one weight target.

17. The food processing system according to claim 1, wherein the pre-defined criteria is a weight interval.

18. The food processing system according to claim 1, wherein the prospect indicator further includes indicating the weight of food items needed to complete the batches.

19. The food processing system according to claim 18, wherein the weight of food items needed to complete the batches is utilized to instruct the food item separation device to cut at least one of the incoming food items accordingly.

20. The food processing system according to claim 1, wherein the batching may include bringing food items together that are not fed to the batching system sequential.

21. The food processing system according to claim 1, wherein a cut-off-target may be defined defining a minimum amount allowed to be removed from the food items.

22. The food processing system according to claim 1, wherein a cut-off-target may be defined defining a maximum amount allowed to be removed from the food items.

23. The food processing system according to claim 1, wherein the batching system further includes a checking facility such that cut food items that are sticking together and where removing the cut part has failed may be detected and may be disregarded in the batching process.

24. A method performed in a food processing system for processing and batching food items conveyed by a conveyor means where the batches fulfil at least one target criteria including at least one weight target, where the food processing system comprises:

a first weight determining means for determining the weight of incoming food items, a batching system, a food item separation device positioned downstream in relation to the first weight determining means and upstream in relation to the batching system, where the food item separation device comprises a cutting device including a cutting means adapted to cut at least some of the incoming food items, a reject device positioned downstream in relation to the food item separation device for automatically rejecting cut parts of the food items after undergoing a food item separation process at the food item separation device, and a control system for controlling the batching system and the food item separation device, the controlling including, repeatedly:

monitoring the weight of the incoming food items, determining, based on the weight of the incoming food items, a prospect indicator indicating the prospect to meet the target criteria for the batches such that each batch fulfils the at least one target criteria, comparing if the prospect indicator fulfils a pre-defined criteria, in case the prospect indicator does not fulfils the pre-defined criteria, instructing the food item separation device to separate at least some of the incoming food items such that the weight of the food items coming to the batching system, after passing the food item separation device, have a prospect indicator fulfilling the pre-defined criteria so that the weight of the food items coming to the batching system becomes useful for completing batching the food items according to the at least one target criteria.

25. The method according to claim 24, wherein the determined weight of the incoming food items define a first weight distribution, and wherein the pre-defined criteria comprises a pre-defined weight interval within the first weight distribution useful for completing batching the food items with minimum overweight, where in case the pre-defined criteria is not fulfilled the weight of the incoming food items is above the pre-defined weight interval.

26. The method according to claim 24, further comprising determining the shape and position of the incoming food items, where the resulting shape and position data are used as control data for cutting at least some of the incoming food items based on the determined shape and position of the incoming food items.

27. The method according to claim 24, further comprising defining a threshold value indicating the minimum or maximum allowable amount to be separated from the at least some of the incoming food items.

28. The method according to claim 24, performed in a food processing system for processing and batching food items conveyed by a conveyor means where the batches fulfil at least one target criteria including at least one weight target, comprising:

a first weight determining means for determining the weight of incoming food items, a batching system, a food item separation device positioned downstream in relation to the first weight determining means and upstream in relation to the batching system, a control system for controlling the batching system and the food item separation device, the controlling including, repeatedly:

monitoring the weight of the incoming food items, determining, based on the weight of the incoming food items, a prospect indicator indicating the prospect to meet the at least one target criteria for the batches such that each batch fulfils the at least one target criteria, comparing if the prospect indicator fulfils a pre-defined criteria, in case the prospect indicator does not fulfil the pre-defined criteria, instructing the food item separation device to separate at least some of the incoming food items such that the weight of the food items coming to the batching system, after passing the food item separation device, have a prospect indicator fulfilling the pre-defined criteria so that the weight of the food items coming to the batching system becomes useful for completing batching the food items according to the at least one target criteria.

* * * * *